United States Patent
Sydon et al.

(10) Patent No.: US 6,466,800 B1
(45) Date of Patent: Oct. 15, 2002

(54) METHOD AND SYSTEM FOR A WIRELESS COMMUNICATION SYSTEM INCORPORATING CHANNEL SELECTION ALGORITHM FOR 2.4 GHZ DIRECT SEQUENCE SPREAD SPECTRUM CORDLESS TELEPHONE SYSTEM

(75) Inventors: Uwe Sydon, Duesseldorf (DE); Juergen Kockman, Duesseldorf (DE); Paulus Sastrodjojo, Round Rock, TX (US)

(73) Assignee: Siemens Information and Communication Mobile, LLC, San Diego, CA (US)

( * ) Notice: Subject to any disclaimer, the term of this patent is extended or adjusted under 35 U.S.C. 154(b) by 0 days.

(21) Appl. No.: 09/444,057

(22) Filed: Nov. 19, 1999

(51) Int. Cl.[7] ............................................... H04L 27/30
(52) U.S. Cl. ..................... 455/464; 455/450; 455/452; 455/550
(58) Field of Search ................................. 455/450, 452, 455/426, 550, 464, 463, 526, 517; 370/498, 509, 510, 512, 513, 514, 515, 350; 375/132, 133

(56) References Cited

U.S. PATENT DOCUMENTS

| | | | | |
|---|---|---|---|---|
| 5,671,219 A | * | 9/1997 | Jensen et al. ............... | 370/280 |
| 5,758,290 A | * | 5/1998 | Nealon et al. ............... | 375/133 |
| 5,809,417 A | * | 9/1998 | Nealon et al. ............... | 455/426 |
| 5,966,665 A | * | 10/1999 | Taki ........................... | 375/134 |
| 6,041,046 A | * | 3/2000 | Scott et al. .................. | 370/319 |
| 6,151,352 A | * | 11/2000 | Taki et al. ................... | 375/132 |
| 6,263,210 B1 | * | 7/2001 | Takahashi .................... | 375/132 |
| 6,363,059 B1 | * | 3/2002 | Kranz et al. ................. | 370/337 |
| 6,366,572 B1 | * | 4/2002 | Esterberg et al. ........... | 370/335 |

* cited by examiner

*Primary Examiner*—Daniel Hunter
*Assistant Examiner*—Andrew T Harry

(57) ABSTRACT

A method and system are provided for selecting a communication channel in a wireless communication system. The method and system include defining a plurality of channel groups. Each channel group corresponds to a plurality of communication channels. The method and system also includes setting a set counter to the channel group having the current communication channel. Further, the set counter is incremented after each channel hop and an index counter is incremented when the set counter resets. Next, a sequence number is determined as a function of the set counter and an identifier is associated with the wireless communication device. The method and system continues with determining an offset as a function of the sequence number and the index counter and determining a next communication channel as a function of the set counter and the offset.

12 Claims, 9 Drawing Sheets

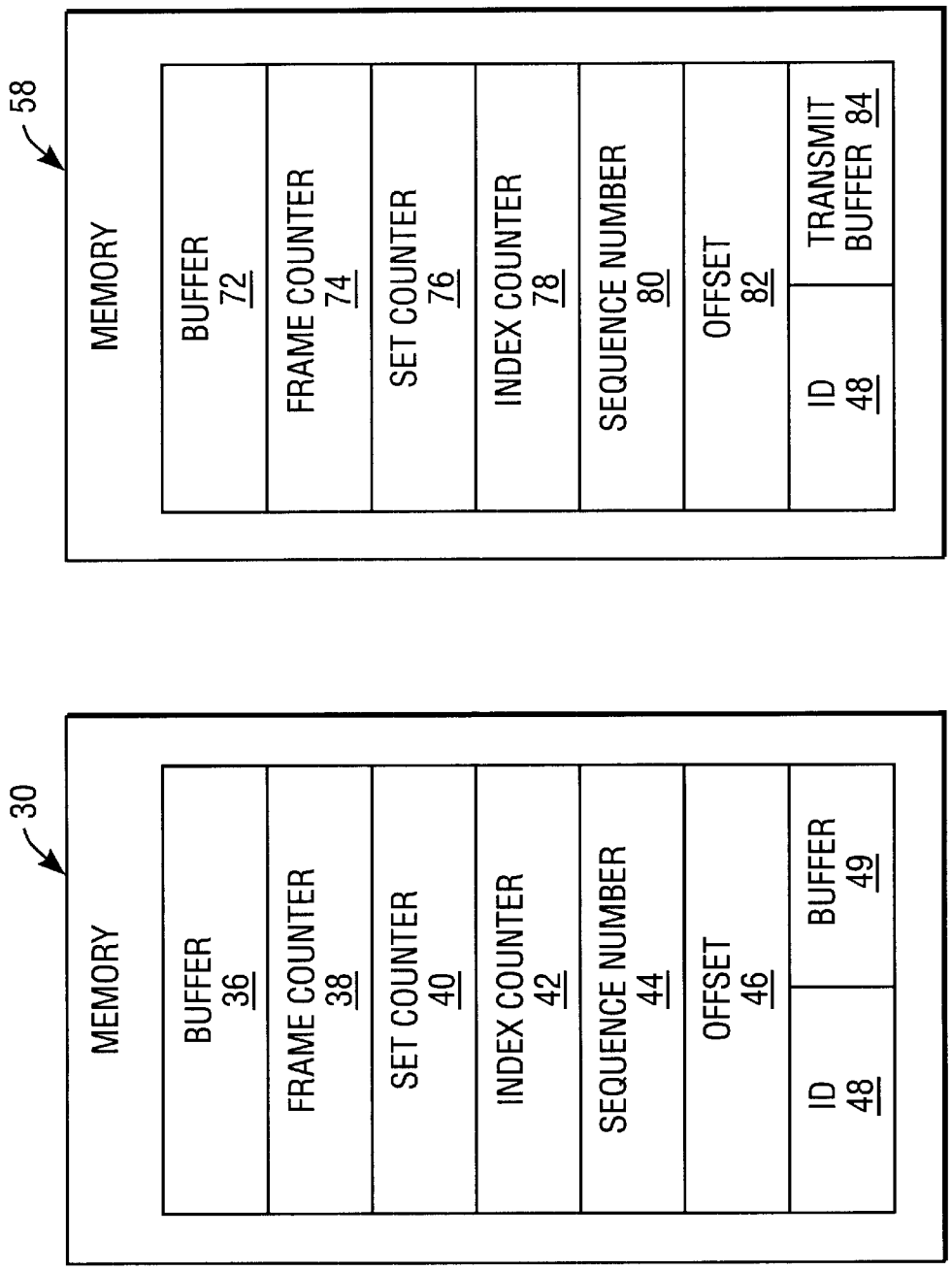

METHOD AND SYSTEM FOR A WIRELESS COMMUNICATION SYSTEM INCORPORATING CHANNEL SELECTION ALGORITHM FOR 2.4 GHZ DIRECT SEQUENCE SPREAD SPECTRUM CORDLESS TELEPHONE SYSTEM

RELATED APPLICATIONS

This application is related to the following co-pending Applications all filed on November 1999.

Ser. No. 09/443939, entitled System and Method for Wireless Communication Incorporating Error Concealment;

Ser. No. 09/443999, entitled System and Method for Simultaneously Testing Multiple Cordless Telephones;

Ser. No. 09/444033, entitled System and Method for Testing An Assembled Telephone;

Ser. No. 09/444058, entitled System and Method for Wireless Communication Incorporating Range Warning;

Ser. No. 09/443968, entitled Method and System for Wireless Telecommunication Between A Mobile Unit and A Base Unit;

Ser. No. 09/443931, entitled Method and System for Avoiding Periodic Bursts of Interference In Wireless Communication Between A Mobile Unit and A Base Unit;

Ser. No. 09/444028, entitled Method and System for Power-Conserving Interference Avoidance in Communication Between A Mobile Unit and A Base Unit In A Wireless Telecommunication System;

Ser. No. 09/444008, entitled Method and System for Changing States In A Wireless Telecommunication System;

Ser. No. 09/443993, entitled Method and System for Wireless Communication Incorporating Distinct System Identifier Bytes to Preserve Multi-frame Synchronization for Systems with Limited Control Channel Bandwidth;

Ser. No. 09/443972, entitled System and Method for Wireless Communication Incorporating Synchronization Concept for 2.4 Ghz Direct Sequence Spread Spectrum Cordless Telephone System;

Ser. No. 09/443166, entitled System And Method For Wireless Communication Incorporating Overloading Prevention Techniques for Multi-frame-synchronized Systems;

Ser. No. 09/443998, entitled System and Method for Wireless Communication Incorporating Preloaded Response Message;

Ser. No. 09/443997, entitled Method and System for Transmitting and Receiving Caller Id Data in a Wireless Telephone System;

Ser. No. 09/443937, entitled Method and System for Prioritization of Control Messages In A Wireless Telephone System;

Ser. No. 09/443996, entitled Method and System for Wireless Telecommunications Using a Multiframe Control Message;

Ser. No. 09/443936, entitled Method and System for Transmitting Caller Id Information from a Base Station to a Mobile Unit Outside the Context of an Incoming Call; and Ser. No. 09/443942, entitled Method and System for Data Compression.

TECHNICAL FIELD OF THE INVENTION

This invention relates generally to the field of wireless communication and, more specifically, to a method and system for a wireless communication system incorporating channel selection algorithm or 2.4 GHz direct sequence spread spectrum cordless telephone system.

BACKGROUND OF THE INVENTION

As society grows more complex and operates at an ever accelerating pace, there has been a growing need for better and more flexible communications devices. One area that has experienced substantial development activity is the area of wireless communication. Wireless systems are also known as portable, cordless or mobile telephone. A typical wireless communications system has a base station located at a customer's or user's premises. The base is connected to the Public Switched Telephone Network over a wireline interface and communicates with a mobile unit or handset over an air interface that permits the user to communicate remotely from the base station. While users desire the freedom and flexibility afforded by mobile wireless communications systems, they typically do not want to sacrifice the numerous features, such as caller ID, that are available through the wireline service over the PSTN. In addition, users of wireless system increasingly demand a voice quality that is as good as the voice quality available over a wireline link.

In the past, the enhanced features and high voice quality demanded by users has been achieved by the use of sophisticated and complex algorithms and methods that require substantial processor resources and large amounts of memory. These processing and memory resources are not only expensive but also place a substantial drain on battery power, therefore shortening the effective use of the mobile unit. Other technical problems associated with the need for using faster and more powerful processors include larger packaging to accommodate the larger sized components and to dissipate the heat generated by such units. Wireless systems have in the past been large, bulky, and have weighed more than what is satisfactory to many users.

While wireless communication devices and methods have provided an improvement over prior approaches in terms of features, voice quality, cost, packaging size and weight, the challenges in the field of wireless telecommunications has continued to increase with demands for more and better techniques having greater flexibility and adaptability.

Therefore, a need has arisen for a new method and system for a method and system for a wireless communication system incorporating channel selection algorithm for 2.4 GHz direct sequence spread spectrum cordless telephone system.

SUMMARY OF THE INVENTION

In accordance with the present invention, a method and system for a wireless communication system incorporating channel selection algorithm for 2.4 GHz direct sequence spread spectrum cordless telephone system is provided that substantially eliminates or reduces disadvantages and problems associated with previously developed systems and methods.

A system and method are disclosed for selecting a communication channel in a wireless communication system. The system and method involve defining a plurality of channel groups. Each channel group corresponds to a plurality of communication channels. Further, a set counter is set to the channel group having the current communication channel. The system and method also involve incrementing the set counter after each channel hop and incrementing an index counter when the set counter resets. In addition, a sequence number is determined as a function of the set counter and an identifier is associated with the wireless communication device. Also, an offset is determined as a function of the sequence number and the index counter and a next communication channel is determined as a function of the set counter and the offset.

A technical advantage of the present invention is the capability for allowing a base unit to find a mobile unit automatically. Another technical advantage of the present invention is allowing longer battery life on the mobile unit by sleeping between broadcasting.

BRIEF DESCRIPTION OF THE DRAWINGS

For a more complete understanding of the present invention, the objects and advantages thereof, reference is now made to the following descriptions taken in connection with the accompanying drawings in which:

FIG. 1A is a block diagram illustrating details of a memory associated with the base station for use in a wireless telecommunication system in accordance with the present invention;

FIG. 1B is a block diagram illustrating details of a memory associated with the mobile unit for use in a wireless telecommunication system in accordance with the present invention;

DETAILED DESCRIPTION OF THE DRAWINGS

The preferred embodiment of the present invention and its advantages are best understood by referring to FIGS. 1 through 8 of the drawings, like numerals being used for like and corresponding parts of the various drawings.

Figure 1:
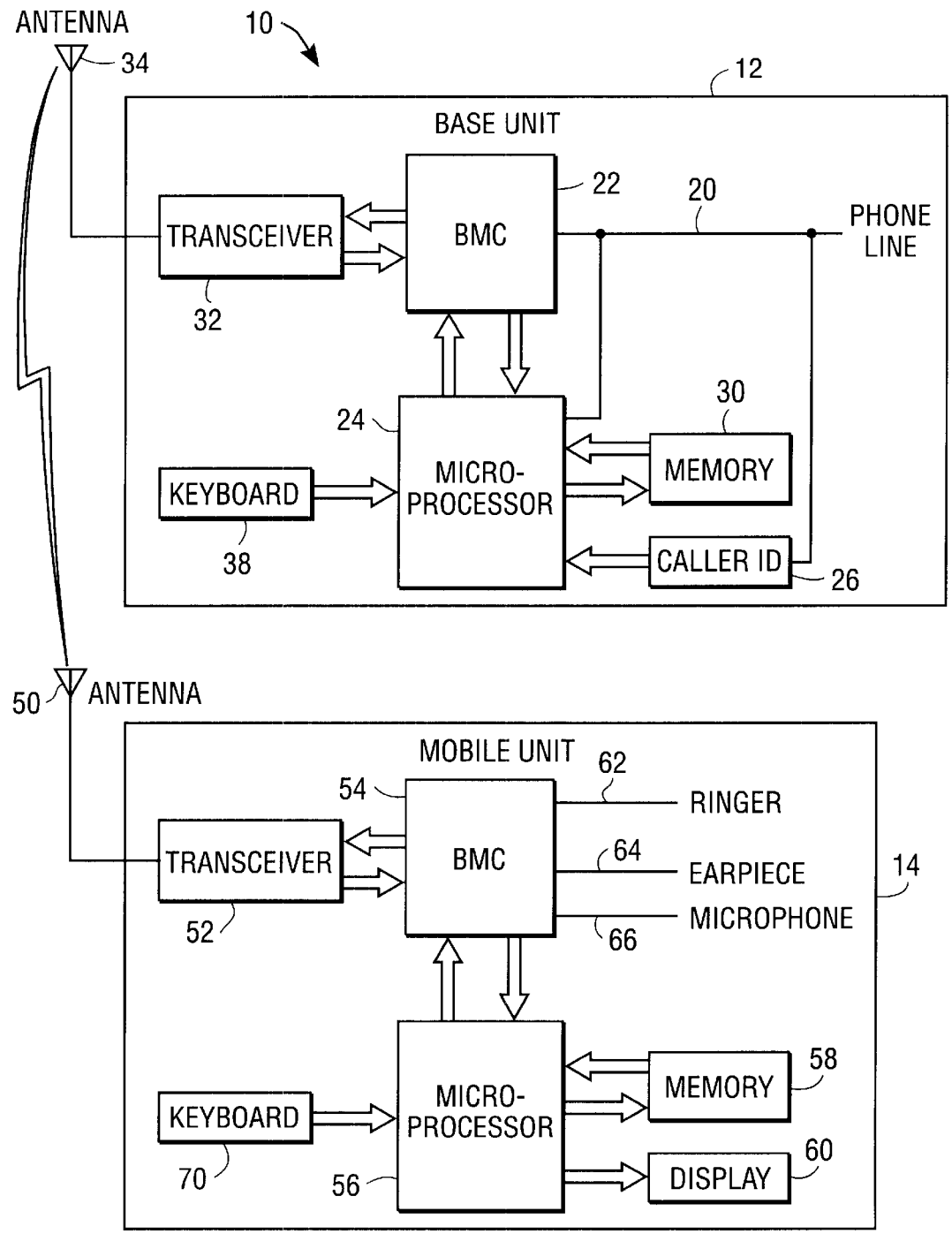
FIG. 1 is a block diagram illustrating a wireless telecommunication system including a base unit and a mobile unit constructed in accordance with the teachings of the present invention.

FIG. 1 is a block diagram illustrating a telecommunication system 10 including a base unit 12 and a mobile unit 14. The base unit 12 and the mobile unit 14 communicate with each other at a frequency in the industrial/scientific/medical (ISM) band. For example, the units 12 and 14 may communicate in the range of 2400 to 2483.5 MHz. It will be understood, however, that the base unit 12 and the mobile unit 14 may communicate with each other at other suitable ISM-band frequencies without departing from the scope of the present invention.

The telecommunication system 10 illustrated in FIG. 1 is a wireless or cordless telephone system. In this exemplary embodiment, the mobile unit 14 comprises a mobile handset that communicates with the base unit 12 over discreet radio frequency channels. Although the telecommunication system 10 is illustrated as a cordless telephone system, it will be understood that the telecommunication system 10 may comprise any suitable type of wireless communication system. For example, the telecommunication system 10 may comprise a cellular telephone system, Local Multiple Distribution Service, and the like, without departing from the scope of the present invention.

In accordance with the exemplary embodiment shown in FIG. 1, the base unit 12 comprises a phone line 20 that is coupled to the Public Switched Telephone Network over a landline for receiving and transmitting voice or other data. For an incoming telephone call, data from the phone line 20 is passed to a microprocessor 24 and a caller ID interface 26. The caller ID interface 26 extracts caller ID information, such as a name and a telephone number associated with the originator of the telephone call, from the data on the phone line 20 and passes it to the microprocessor 24. The microprocessor 24 communicates with an internal memory 30 while processing the data received from the phone line 20 and the caller ID interface 26.

The microprocessor 24 then communicates the processed data from the phone line 20 and the caller ID interface 26, along with any additional data that needs to be transmitted to the mobile unit 14, to a burst mode controller (BMC) 22. The BMC 22 also receives data directly from the phone line 20, which is processed along with the data from the microprocessor 24. For example, the BMC 22 packages voice data from the phone line 20 with additional data from the microprocessor 24 into one frame structure. The BMC 22 also communicates the data to a transceiver 32 which transmits a signal through an antenna 34 to the mobile unit 14. The base unit 12 also comprises a keyboard 38 for inputting data to the microprocessor 24. The keyboard 38 may comprise a numeric keypad for entering a telephone number or other data. The keyboard 38 may also comprise a pager button for paging the mobile unit 14 such that the mobile unit 14 provides a sound for locating the mobile unit 14.

The mobile unit 14 receives the signal from the base unit 12 through an antenna 50 which passes the data to a transceiver 52. The transceiver 52 processes the data and it to a BMC 54, which unpackages the data and communicates with a microprocessor 56. The microprocessor 56 communicates with an internal memory 58 and sends data to a display 60, such as an LCD or LED. For example, the microprocessor 56 may send to the display 60 a name and a telephone number extracted by the caller ID interface 26 in the base unit 12.

The BMC 54 also sends a signal to a ringer 62 to notify a user of an incoming call. After the user responds by activating the mobile unit 14, the BMC 54 sends the voice data received from the base unit 12 to an earpiece 64. After the connection is completed, voice data for transmission to the phone line 20 through the base unit 12 is received by the BMC 54 from the microphone 66. This data is transmitted from the mobile unit 14 to the base unit 12 in a similar manner to the transmission of data from the phone line 20 to the earpiece 64. The mobile unit 14 also comprises a keyboard 70 for a user to enter information for communication to the microprocessor 56. This keyboard 70 may be, for example, a numeric keypad on a mobile telephone handset for entering a telephone number.

The same process is also used for an outgoing telephone call, beginning with the activation of the mobile unit 14, which sends a signal through the BMC 54 to the transceiver 52 and from the transceiver 52 to the antenna 50. From the antenna 50 of the mobile unit 14 the signal is transmitted to the antenna 34 of the base unit 12, which passes the signal to the transceiver 32. The transceiver 32 passes the signal through the BMC 22 to the phone line 20. The telephone number being called, caller ID information, voice and other data is then communicated back and forth between the mobile unit 14 and the base unit 12 as previously described.

FIG. 1A is a block diagram illustrating details of memory 30 associated with base station 12 for use in wireless telecommunication system 10. Base unit 12 further includes a buffer 36, a frame counter 38, a set counter 40, and index counter 42, a sequence number 44, an offset 46 and a transmit buffer 49 supported by memory 30. Buffer 36 comprises an updateable portion of memory 30, such as random access memory, operable to store data. Buffer 36 may comprise any suitable amount or portion of memory 30 for supporting communication between mobile unit 14 and base unit 12. In the disclosed embodiment, buffer 36 is 16 bytes long. Frame counter 38 comprises an updateable portion of memory 30. In the disclosed embodiment, frame counter 38 comprises sequential integers ranging from 0 to 7, inclusive, but any other suitable values having order may be used. Set counter 40 comprises an updateable portion of memory 30, such as random access memory, operable to store data. Set counter 40 may comprise any suitable amount or portion of memory 30 for supporting communication between mobile unit 14 and base unit 12. In the disclosed embodiment, set counter 40 is an integer counter ranging from 0 to 3, inclusive, but any other suitable values having order may be used. Index counter 42 comprises an updateable portion of memory 30, such as random access memory, operable stored data. Index counter 42 may comprise any suitable amount or portion of memory 30 for supporting communication between mobile unit 14 and base unit 12. In the disclosed embodiment, index counter 42 comprises an integer counter ranging from 0 to 13, inclusive, but any other suitable values having order may be used. Sequence number 44 comprises an updateable portion of memory 30, such as random access memory, operable stored data. Sequence number 44 may comprise any suitable amount or portion of memory 30 for supporting communication between mobile unit 14 and base unit 12. In the disclosed embodiment, sequence number 44 comprises integers ranging from 0 to 7, inclusive, but any other suitable values having order may be used. Offset 46 comprises an updateable portion of memory 30, such as random access memory, operable stored data. Offset 46 may comprise any suitable amount or portion of memory 30 for supporting communication between mobile unit 14 and base unit 12. In the disclosed embodiment, offset 46 is an integer value ranging from 0 to 12, inclusive, but any other suitable values having order may be used. Buffer 49 comprises an updateable portion of memory 30, such as random access memory, operable stored data. Buffer 49 may comprise any suitable amount or portion of memory 30 for supporting communication between mobile unit 14 and base unit 12. Base unit 12 further includes an identifier 48. Identifier 48 is a three-byte value for identifying base unit 12. In the disclosed embodiment, identifier 48 comprises $ID_3$, $ID_2$ and $ID_1$ (see FIG. 3).

FIG. 1B is a block diagram illustrating details of memory 58 associated with mobile unit 14 for use in wireless telecommunication system 10. Mobile unit 14 further includes a buffer 72, a frame counter 74, a set counter 76, an index counter 78, a sequence number 80, an offset 82, a transmit buffer 84 and identifier 48 supported by memory 58. Buffer 72 comprises an updateable portion of memory 58, such as random access memory, operable to store data. Buffer 74 may comprise any suitable amount or portion of memory 58 for supporting communication between mobile unit 14 and base unit 12. In the disclosed embodiment, buffer 72 is 16 bytes long. Frame counter 74 comprises an updateable portion of memory 58. In the disclosed embodiment, frame counter 38 comprises sequential integers ranging from 0 to 7, inclusive, but any other suitable values having order may be used. Set counter 76 comprises an updateable portion of memory 58, such as random access memory, operable to store data. Set counter 76 may comprise any suitable amount or portion of memory 58 for supporting communication between mobile unit 14 and base unit 12. In the disclosed embodiment, set counter 76 is an integer counter ranging from 0 to 3, inclusive, but any other suitable values having order may be used. Index counter 78 comprises an updateable portion of memory 58, such as random access memory, operable stored data. Index counter 78 may comprise any suitable amount or portion of memory 58 for supporting communication between mobile unit 14 and base unit 12. In the disclosed embodiment, index counter 78 comprises an integer counter ranging from 1 to 13, inclusive, but any other suitable values having order may be used. Sequence number 80 comprises an updateable portion of memory 58, such as random access memory, operable stored data. Sequence number 80 may comprise any suitable amount or portion of memory 58 for supporting communication between mobile unit 14 and base unit 12. In the disclosed embodiment, sequence number 80 comprises integers ranging from 0 to 7, inclusive, but any other suitable values having order may be used. Offset 82 comprises an updateable portion of memory 58, such as random access memory, operable stored data. Offset 82 may comprise any suitable amount or portion of memory 58 for supporting communication between mobile unit 14 and base unit 12. In the disclosed embodiment, offset 82 is an integer value ranging from 0 to 12, inclusive, but any other suitable values having order may be used. Buffer 84 comprises an updateable portion of memory 58, such as random access memory, operable stored data. Buffer 84 may comprise any suitable amount or portion of memory 58 for supporting communication between mobile unit 14 and base unit 12. Each mobile unit 14 and base unit 12 are assigned the same three byte identifier 48. Identifier 48 allows mobile unit 14 to determine that base unit 12 is the base unit associated with mobile unit 14. Similarly, identifier 48 allows base unit 12 to determine that mobile unit 14 is the mobile unit associated with base unit 12.

Mobile unit 14 and base unit 12 communicate over a wireless or air interface using a multi-frame communication protocol. A frame is a logical construct for transmitting control signals and data, such as payload data, between mobile unit 14 and base unit 12.

Figure 2:
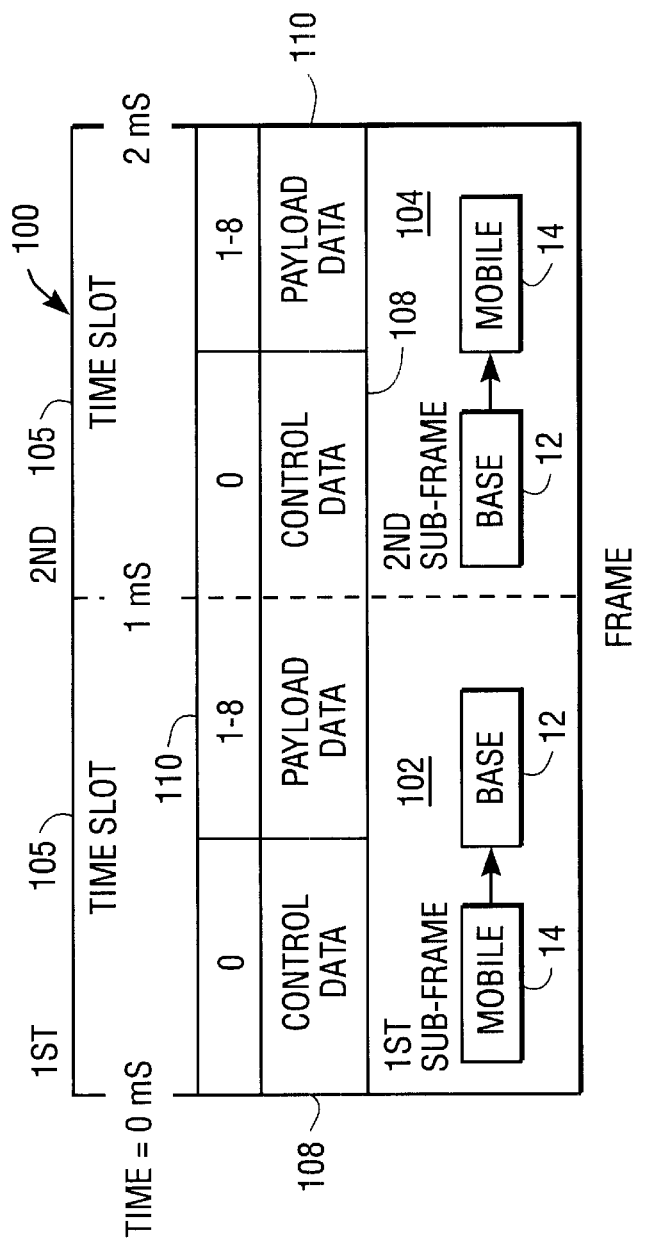
FIG. 2 illustrates a the frame structure of a multi-frame communication protocol used with the wireless telecommunication system of FIGS. 1A and 1B.

FIG. 2 illustrates a frame 100 structure of the multi-frame communication protocol used with telecommunication system 10 of the present invention. Frame 100 has first and second sub-frames 102 and 104. Each of sub-frames 102 and 104 has control data 108 and payload data 110. Control data 108 is control data for controlling the connection between the mobile unit 14 and the base unit 12. For example, control data may comprise identification data, a channel change command, a power management command and other suitable control data associated with communication between mobile unit 14 and base unit 12. Payload data 110 is the data being communicated between mobile unit 14 and base unit 12. For example, payload data 110 may comprise voice data associated with a user who is using mobile unit 14 and base unit 12 to support a phone conversation. Each sub-frame is transmitted for 1 millisecond so an entire frame is transmitted every 2 milliseconds. In the present embodiment, mobile unit 14 transmits to base unit 12 during the first sub-frame 102 and receives during second sub-frame 104. Mobile unit 12 and base unit 14 each transmit and receive data during frame 100. While the time duration for frame 100 has been illustrated as 2 milliseconds, any suitable time duration may be employed.

Transmission of frame 100 always originates at mobile unit 14. Base unit 12 is restricted to transmitting sub-frame 104 in second time slot 105 after receiving sub-frame 102 from mobile unit 14 in first time slot 103.

Figure 2A:
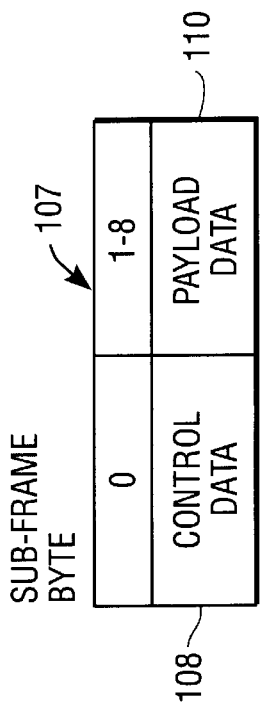
FIG. 2A illustrates a sub-frame structure of the multi-frame communication protocol used with the wireless telecommunication system of the present invention.

FIG. 2A illustrates a sub-frame 107 structure of the multi-frame communication protocol used with wireless telecommunication system 10 of the present invention. For increased clarity, FIG. 2A is discussed in combination with FIG. 2. Sub-frames 102 and 104 communicated during first time slot 102 and second time slot 104, respectively, are substantially similar in format. Sub-frame 107 is substantially similar to sub-frames 102 and 104 and represents a general sub-frame which could be transmitted during either of first time slot 102 and second time slot 104. In the disclosed embodiment, sub-frame 107 comprises 9 bytes of data, but may comprise any suitable length and format suitable for supporting communication between mobile unit 14 and base unit 12. One byte of the 9 bytes is a control section 108 and the remaining 8 bytes is payload section 110. In the disclosed embodiment, the 1st byte of sub-frame 107 is the control section 108 and bytes 2–9 are the payload section 110. Control section 108 comprises control data for controlling the connection between the mobile unit 14 and the base unit 12. For example, control data may comprise identification data, a channel change command, a power management command and other suitable control data associated with communication between mobile unit 14 and base unit 12. Payload section 110 comprises the data being communicated between mobile unit 14 and base unit 12. For example, payload section 110 may comprise voice data associated with a user who is using mobile unit 14 and base unit 12 to support a phone conversation.

Figure 3:
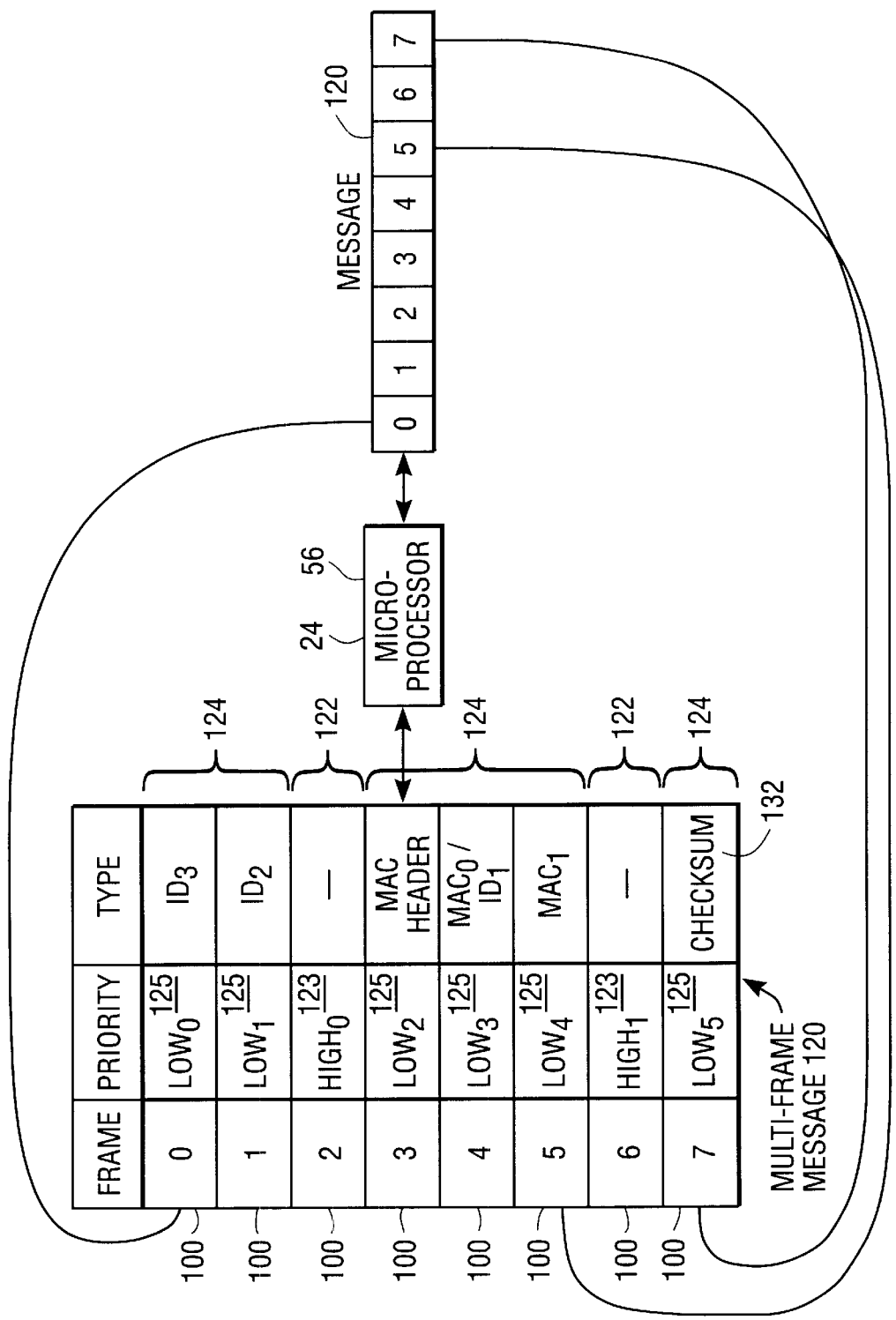
FIG. 3 illustrates an exemplary multi-frame message constructed from a plurality of frames.

FIG. 3 illustrates an exemplary multi-frame message 120 constructed from a plurality of frames 100. Communication over low-speed communication links, such as wireless links with only limited amounts of control channel bandwidth per frame, may prevent the inclusion of sequencing and complete control information during a single frame 100. A low-speed communication link may comprise any speed of communication link where the amount of data to be transferred exceeds the available bandwidth. In general, "low-speed" is a relative measure of bandwidth available versus amount of data to be transferred and does not indicate any particular absolute speed. In the disclosed embodiment, the available bandwidth is 8 kilobits per second and is divided evenly between time slots 103 and 105 which are each give 4 kilobits per second of bandwidth. Due to bandwidth limitations, control section 108 has only 1 byte of data during each sub-frame 107. However, more than 1 byte of control data may be necessary to exchange complete control messages 120 between mobile unit 14 and base unit 12. Thus, mobile unit 14 and base unit 12 communicate control data using multi-frame message 120. Multi-frame messages 120 are used to support the communication of multiple bytes of control data between mobile unit 14 and base unit 12 even though each sub-frame 107 comprises only a one-byte control section 108.

Multi-frame 120 comprises an 8 byte message constructed from 8 one-byte control sections 108. Multi-frame 120 comprises a high priority portion 122 and a low priority portion 124. High priority data 122 comprises the third and seventh bytes of multi-frame message 120. Low priority data 124 comprises bytes 1, 2, 4–6 and 8 of multi-frame message 120. High priority data 122 is used to communicate urgent control data between mobile unit 14 and base unit 12. For example, high priority data 122 may comprise a channel change indication, which channel to change to in response to a channel change indication, and other urgent information for mobile unit 14 or base unit 12. Low priority data 124 comprises identification information, application information, connection control information, and other suitable non-urgent control information for mobile unit 14 and base unit 12.

Control messages 120 are received one-byte-at-a-time over 8 frames 100 at base and mobile units 12 and 14. The received control message 120 is stored byte-by-byte in respective buffers 36 and 72 and is fully constructed when 8 bytes are received. High priority data 122 is divided into 2 high priority portions 123. Each high priority 123 comprises one byte and will be processed immediately by the respective receiving units 12 and 14. Each high priority portion 123 may optionally be stored at either or both of units 12 and 14. Low priority data 124 is divided into 6 low priority portions 125. Each low priority portion 125 comprises one byte and is stored until all 6 bytes of low-priority data 124 is received. Low priority data 124 is processed after all 8 bytes of message 120 have been received. Low priority data 124 may alternatively be partially processed before the entire message 120 is received.

In the exemplary illustration of FIG. 3, 8 frames are communicated between mobile unit 14 and base unit 12 over 16 milliseconds. After 8 frames, each of mobile unit 14 and base unit 12 will have respective complete control message 120. At mobile unit 14, control message 120 is constructed by storing each byte of control message 120 received at mobile unit 14 in buffer 72. Similarly, at base unit 12, control message 120 is constructed by storing each byte of control message 120 received at base unit 12 in buffer 36. In the disclosed embodiment, one group of low priority data 124 is stored. Specifically, one multi-frame message 120 worth of low priority data 124 is stored in buffers 36 and 72. Thus, only 6 bytes worth of low priority portions 125 are stored. Alternatively, a plurality of messages 120 worth of low priority data 124 may be stored.

High priority data 122 is also stored. In the disclosed embodiment, a group of four high priority portions 123 are stored. The current high priority portion 123 is stored and the three previous high priority portions 123 are stored. Stated another way, four frames 100 worth of high priority data 122 are stored and then processed together as a group. In alternative embodiment, each high priority portion 123 is processed as it is received.

At both base unit 12 and mobile unit 14, frame counters 38 and 74 (FIGS. 1A and 1B) are respectively initialized to zero. As each sub-frame 107 is respectively received at mobile unit 14 and base unit 12, frame counters 38 and 74 are respectively incremented. Frame counters 38 and 74 are used to maintain synchronization because no sequencing information is transmitted as part of the control section 108. Frame counters 38 and 74 preferably maintain synchronization so that multi-frame messages 120 are received and decoded in the proper order. Specifically, since no sequencing information is communicated as part of the control section 108, frame counters 38 and 74 are used to determine which element of message 120 is being communicated by base and mobile units 12 and 14. Frame counters 38 and 74 are aligned with each other so that message 120 is properly received. For example, base unit 12 knows that it is receiving $ID_3$ (FIG. 3) when frame counter 38 is 0 and that base unit 12 is receiving the MAC header when frame counter is 3.

Frame counters 38 and 74 are each incremented modulo 8. Stated another way, each frame counter 38 and 74 sequentially cycles through the integer series 0 to 7, inclusive.

In operation, mobile unit 14 initiates all communications with base unit 12. Base unit 12 does not transmit except in response to mobile unit 14. Specifically, mobile unit 14 transmits in first time slot 102 of frame 100 and base unit 12 transmits in section time slot 104 of frame 100.

Each of mobile unit 14 and base unit 12 may be in one of three states. The three states comprise an active state, an idle state, and a synchronizing state. The synchronizing state indicates that mobile unit 14 and base unit 12 are negotiating various communication parameters necessary for proper communication between mobile unit 14 and base unit 12. In the idle state, neither mobile unit 14 nor base unit 12 are actively engaged in providing communication services to a user of system 10. In the idle state, one frame 100 is sent approximately every second in order to save battery power on mobile unit 14 while maintaining communication with base unit 12. In the active state, mobile unit 14 and base unit 12 are actively communicating data, such as voice data associated with the user of system 10.

When mobile unit 14 and base unit 12 are first synchronized, they agree on an initial channel over which to communicate. A channel is a particular frequency and, in the disclosed embodiment, mobile unit 14 and base unit 12 may communicate using any of 52 distinct channels. After an initial channel has been agreed upon by mobile unit 14 and base unit 12, mobile unit 14 and base unit 12 enter the synchronization state and exchange information for supporting communication between them. After synchronization mobile unit 14 and base unit 12 enter the idle state and wait for activity, such as an incoming call or an out-going call. Once there is activity, mobile unit 14 and base unit 12 enter the active state and provide the desired communication services. When the activity is finished, mobile unit 14 and base unit 12 return to the idle state.

Figure 4:
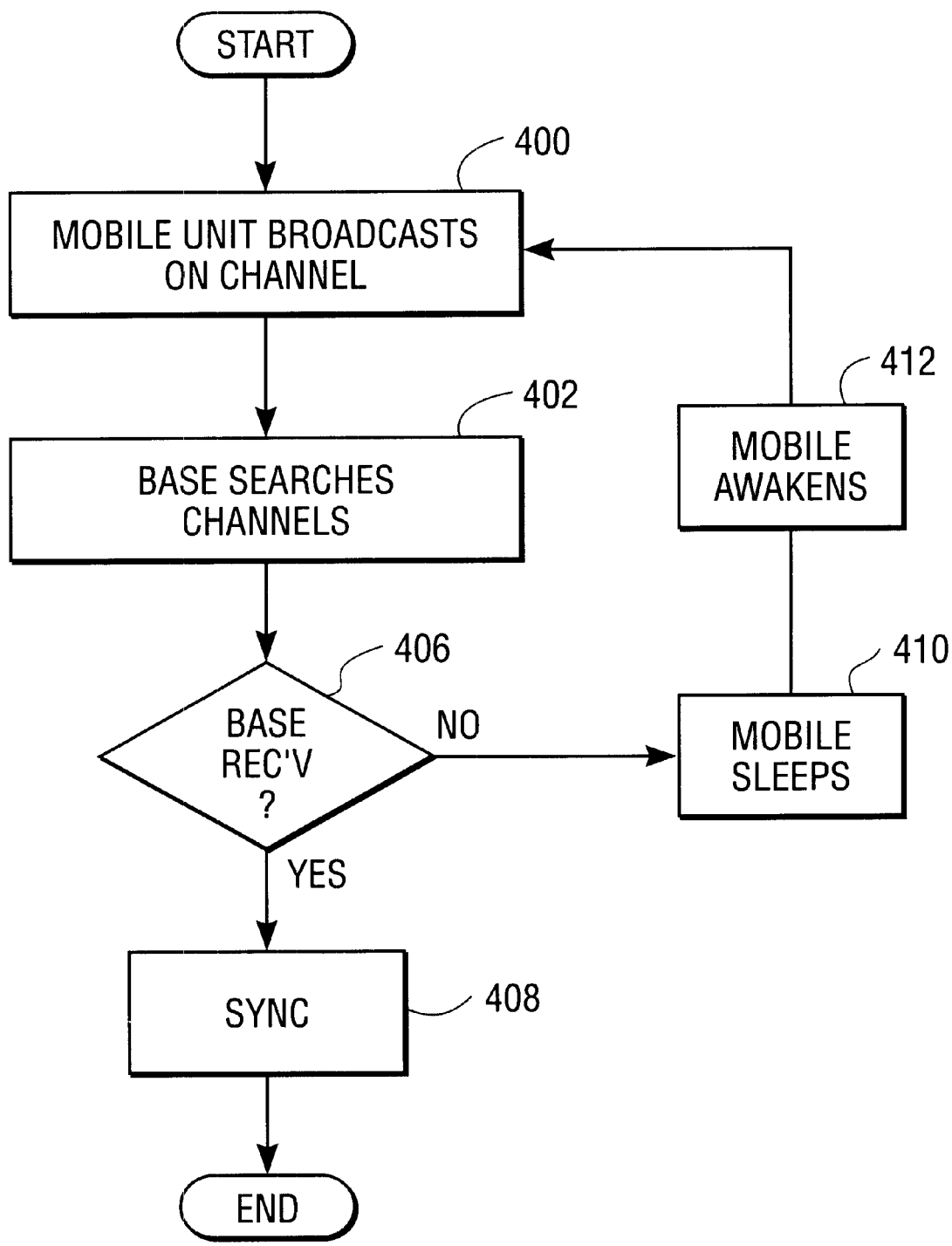
FIG. 4 illustrates a method for establishing an initial communications channel between a base station and a mobile unit.

FIG. 4 illustrates a method for establishing an initial communications channel between mobile unit 14 and base unit 12. After power up of mobile unit 14 and base unit 12, mobile unit 14 and base unit 12 negotiate the initial channel over which synchronization will occur. Power up of mobile unit 14 and base unit 12 may occur at separate times. At step 400, after power up, mobile unit 14 begins broadcasting on channel 0. Mobile unit 14 may alternatively begin broadcasting on any of the 52 channels. The channels are sequentially numbered from 0 to 51. After power up, at step 402, base unit 12 will begin with channel 0 and cycle through each of the channels until receiving sub-frame 107 from mobile unit 14 on a particular channel. Base unit 12 will repeatedly cycle through each of the channels until receiving sub-frame 107. Alternatively, base unit 12 may begin searching on any of the 52 channels. Often both mobile unit 14 and base unit 12 begin with the same channel, but may begin on different channels.

Mobile unit 14 will continuously transmit on channel 0 until a predetermined period of time has passed. The predetermined period of time is determined as a function of the amount of time it takes for base unit 12 to cycle through all 52 channels in step 402. In the disclosed embodiment, mobile unit 14 transmits on channel 0 for approximately 180 frames totaling 360 milliseconds. The determination of the particular value of 180 frames is described below in association with step 402.

At step 402, base unit 12 cycles through each of the 52 channels. Specifically, base unit 12 starts with channel 0 and listens for sub-frame 107 from mobile unit 14. Base unit 12 listens for 3 sub-frame 107 periods, totaling 3 milliseconds, before switching to the next channel. Base unit 12 sequentially listens on each of the 52 channels. If base unit 12 successfully receives sub-frame 107, the channel on which sub-frame 107 is received is used by mobile unit 14 and base unit 12 as the initial communication channel for synchronizing mobile unit 14 and base unit 12. In the disclosed embodiment, base unit 12 requires approximately 6 milliseconds, or 3 frames 100, worth of time, to listen at each channel. Two frames 100 are spent listening to the channel, one frame 100 is spent switching to the new channel and settling into the channel so that base unit 12 can receive a broadcasted sub-frame 107 from mobile unit 14.

Next, at decisional step 406, the method determines whether base unit 12 has received the frames being broadcast by mobile unit 14. If base unit 12 has received sub-frame 107 being broadcast by mobile unit 14, then the YES branch of decisional step 406 is followed to step 408. At step 408, mobile unit 14 and base unit 12 begin the synchronization process using the channel that base unit 12 found mobile unit 14 on.

If base unit 12 has searched all channels and not been able to find mobile unit 14 then the NO branch of decisional step 406 is followed to step 410. Base unit 12 may not have been able to detect the broadcast from mobile unit 14 because of interference, lack of range, or for other reasons. At step 410, mobile unit 14 sleeps for a predetermined period of time after having broadcast long enough for base unit 12 to have listened on each of the 52 channels. In the disclosed embodiment, mobile unit 14 sleeps for 640 milliseconds. Mobile unit 14 will go to sleep after the predetermined period of time described in step 400. Mobile unit 14 must ensure that it does not go to sleep before base unit 12 has had the opportunity to listen on each of the 52 channels. Thus, the time delay before putting the mobile unit to sleep is a function of the amount of time base unit 12 takes to listen on a particular channel plus any overhead in switching between channels for all 52 channels. In the disclosed embodiment, the delay is approximately 180 frames totaling 360 milliseconds.

Next, at step 412, mobile unit 14 awakens and switches to the next channel. Mobile unit 14 switches to the next channel under the assumption that since base unit 12 could not detect the broadcast from mobile unit 14 on the previous channel that some interference or other cause has rendered the previous channel unsuitable. Mobile unit 14 may simply progress to the next sequential channel, for example, after trying channel 1 mobile unit 14 simply moves to channel 2. Mobile unit 14 may also use some other criteria to determine the next channel to attempt to find base unit 12 on, for example, mobile unit 14 may skip to a different part of the channel spectrum based on the assumption that if a channel in a particular frequency spectrum did not work then a channel in another frequency spectrum may be more likely to successfully connect to base unit 12. The method then returns to step 400.

Figure 5:
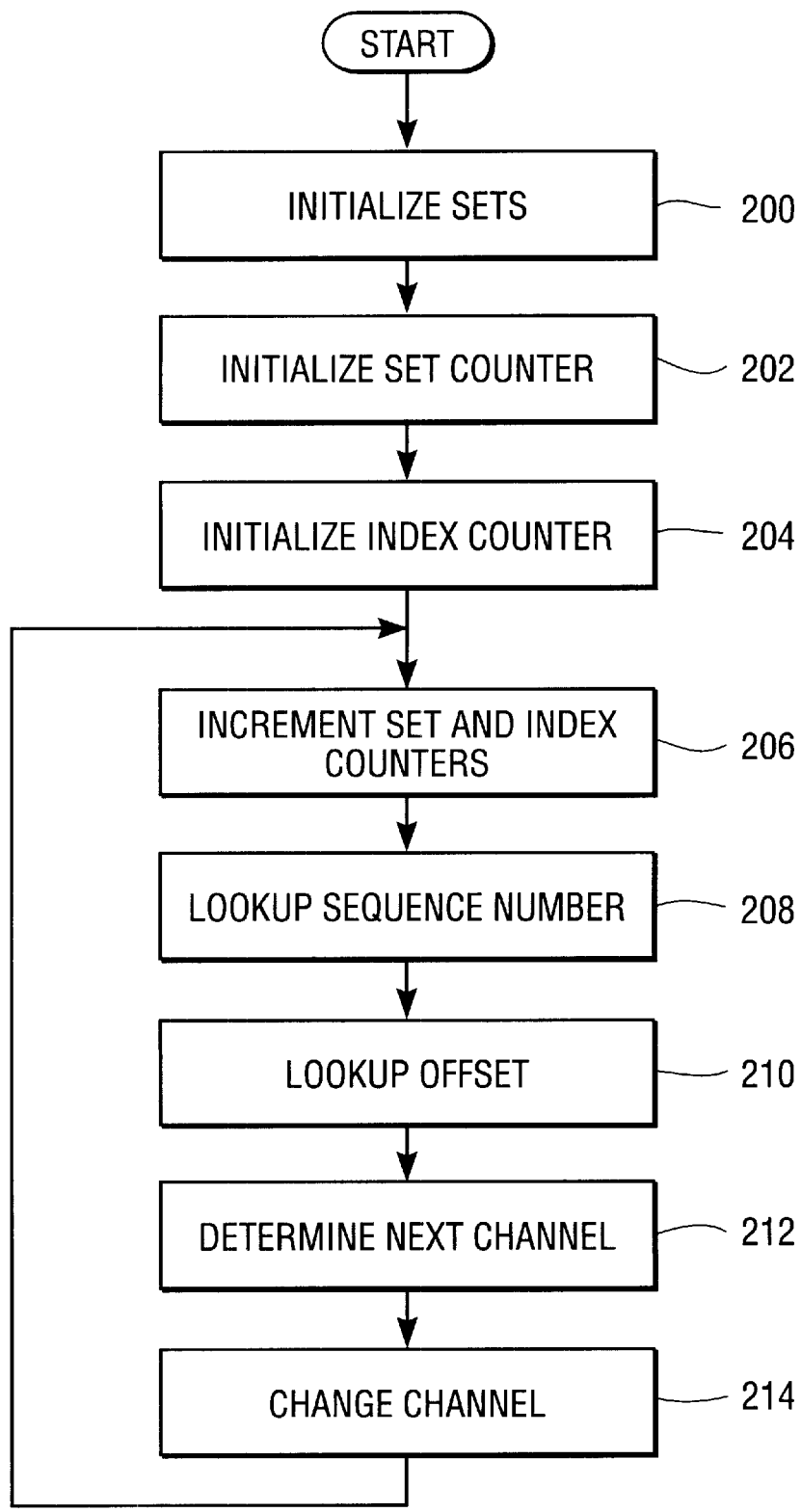
FIG. 5 is a flowchart illustrating a method for channel hopping in accordance with the teachings of the present invention.

FIG. 5 is a flowchart illustrating a method for channel hopping of the present invention. Mobile unit 14 and base unit 12 independently determine which channel to hop to next. A hop comprises changing from one channel to another channel. However, both mobile unit 14 and base unit 12 utilize the same method for determining the next channel and thus remain in synchronization without exchanging channel change information during normal operation. By not exchanging channel change information under normal operation, the limited available bandwidth between mobile unit 14 and base unit 12 is preserved for other uses. Mobile unit 14 and base unit 12 change channels after a predetermined interval of time. In the disclosed embodiment, mobile unit 14 and base unit 12 will change channel when the channel is disrupted, for example, by frames 100 being corrupted by interference. Mobile unit 14 and base unit 12 may alternatively change channels after a predetermined period of time. Therefore, the single method described below occurs substantially simultaneously on both mobile unit 14 and base unit 12.

During operation mobile unit 14 and base unit 12 will cycle through a plurality of different channels in order to provide increased quality and reliability of communication service.

The method for determining which channel to use and in which order begins at step 200. At step 200, plurality of sets, specifically, sets 0 through 3, are initialized. Each set is a logical grouping which includes a plurality of channels. In the disclosed embodiment, each set includes 13 distinct channels. Set 0 includes channels 0 through 12, inclusive, set 1 includes channels 13 through 25, inclusive, set 2 includes channels 26 through 38, inclusive, and set 3 includes channels 39 through 51, inclusive. Alternatively, a different number of sets may be used and various numbers and distribution of channels may be used to provide a more optimal distribution of channels. Then, at step 202, set counter 40 on base unit 12 is initialized to 0 and set counter 76 on mobile unit 14 is initialized to 0. Then, at step 204, index counter 42 on base unit 12 and index counter 78 on mobile unit 14 are initialized to 1.

Proceeding to step 206, set counters 40 and 76 are incremented by 1 modulo of the number of sets. In the disclosed embodiment, set counter ranges from 0 to 3 inclusive and is incremented to 1 at the first iteration of step 206. Also, in step 206, after set counters 40 and 76 are incremented, the method determines whether to increment index counters 42 and 78. Index counters 42 and 78 are incremented by one modulo 13 plus 1 when set counters 40 and 76, respectively, are 0. Index counters 42 and 78 are incremented modulo 13 plus 1, in the disclosed embodiment, so that index counters 42 and 78 range from 1 to 13, inclusive. In the disclosed embodiment, since set counter is incremented to 1 before the determination whether to increment index counters 42 and 78 performed, index counter 42 and 78 are not incremented at the first iteration of step 206.

Next, at step 208, sequence number 42 on base unit 12 and sequence number 80 on mobile unit 14 are determined. Specifically, sequence number 42 is determined from identifier 48 associated with base unit 12 and the current value of set counter 40 on base unit 12. Sequence number 80 is determined from identifier 48 associated with mobile unit 14 and the current value of set counter 76 on mobile unit 14. The three least significant bits (LSB) of identifier 48 associated with base unit 12 and mobile unit 14 and the current value of the respective set counters 40 and 76 are used to look up the value of sequence number 42 and 80 in Table 1.

TABLE 1

| 3 LSB Identity | Set Counter 0 | Set Counter 1 | Set Counter 2 | 3 |
|---|---|---|---|---|
| 0 | 0 | 1 | 2 | 3 |
| 1 | 0 | 2 | 1 | 3 |
| 2 | 3 | 1 | 2 | 0 |
| 3 | 3 | 2 | 1 | 0 |
| 4 | 2 | 3 | 0 | 1 |
| 5 | 2 | 0 | 3 | 1 |
| 6 | 1 | 3 | 0 | 2 |
| 7 | 1 | 0 | 3 | 2 |

The value determined by this lookup is then respectively placed in sequence number 42 and 80. For example, if the three least significant bits of identifier 48 equal 3 and set counters 40 and 76 are 1, then sequence numbers 42 and 80 will be 2.

An advantage of using identifier 48 as part of the channel hopping method is that the likelihood of two unrelated base unit/mobile unit pairs colliding on multiple frequency hops is decreased. For example, if all base unit/mobile unit pairs hopped in the exact same order, any two base unit/mobile unit pairs could continuously interfere regardless of the number of channel hops. In contrast, by using identifier 48 as part of the determination of the next channel to hop to, unrelated base unit/mobile unit pairs are unlikely to continuously interfere with each other after channel hopping.

Then, at step 210, offsets 44 and 82 are determined. Offsets 44 and 82 are determined using the current value of sequence numbers 42 and 80 and index counters 42 and 78. Specifically, offsets 44 and 82 are determined by looking-up the value of sequence numbers 42 and 80 and index counters 42 and 78 in Table 2.

TABLE 2

| Sequence Number | Index Counter | | | | | | | | | | | | |
|---|---|---|---|---|---|---|---|---|---|---|---|---|---|
| | 1st | 2nd | 3rd | 4th | 5th | 6th | 7th | 8th | 9th | 10th | 11th | 12th | 13th |
| 0 | 2 | 3 | 4 | 0 | 1 | 6 | 5 | 8 | 7 | 11 | 12 | 9 | 10 |
| 1 | 1 | 0 | 2 | 4 | 3 | 5 | 7 | 6 | 8 | 12 | 10 | 11 | 9 |

TABLE 2-continued

Index Counter

| Sequence Number | 1st | 2nd | 3rd | 4th | 5th | 6th | 7th | 8th | 9th | 10th | 11th | 12th | 13th |
|---|---|---|---|---|---|---|---|---|---|---|---|---|---|
| 2 | 3 | 4 | 0 | 1 | 2 | 8 | 6 | 7 | 5 | 9 | 11 | 10 | 12 |
| 3 | 0 | 3 | 1 | 2 | 4 | 7 | 8 | 5 | 6 | 10 | 9 | 12 | 11 |

The resulting value is then loaded into offsets 44 and 82.

Proceeding to step 212, the next channel is determined by the formula next channel=13×set counter+offset.

The constant value 13 is determined by the number of channels in each set. For example, if only 5 channels are in each set then the constant 13 would be replaced by 5. By multiplying the number of channels by the set counter, the proper set of channels is determined. By then adding in the offset, a particular channel within the set is determined. Then, at step 214, the mobile unit and base unit 14 and 12 change to the next channel.

Figure 6:
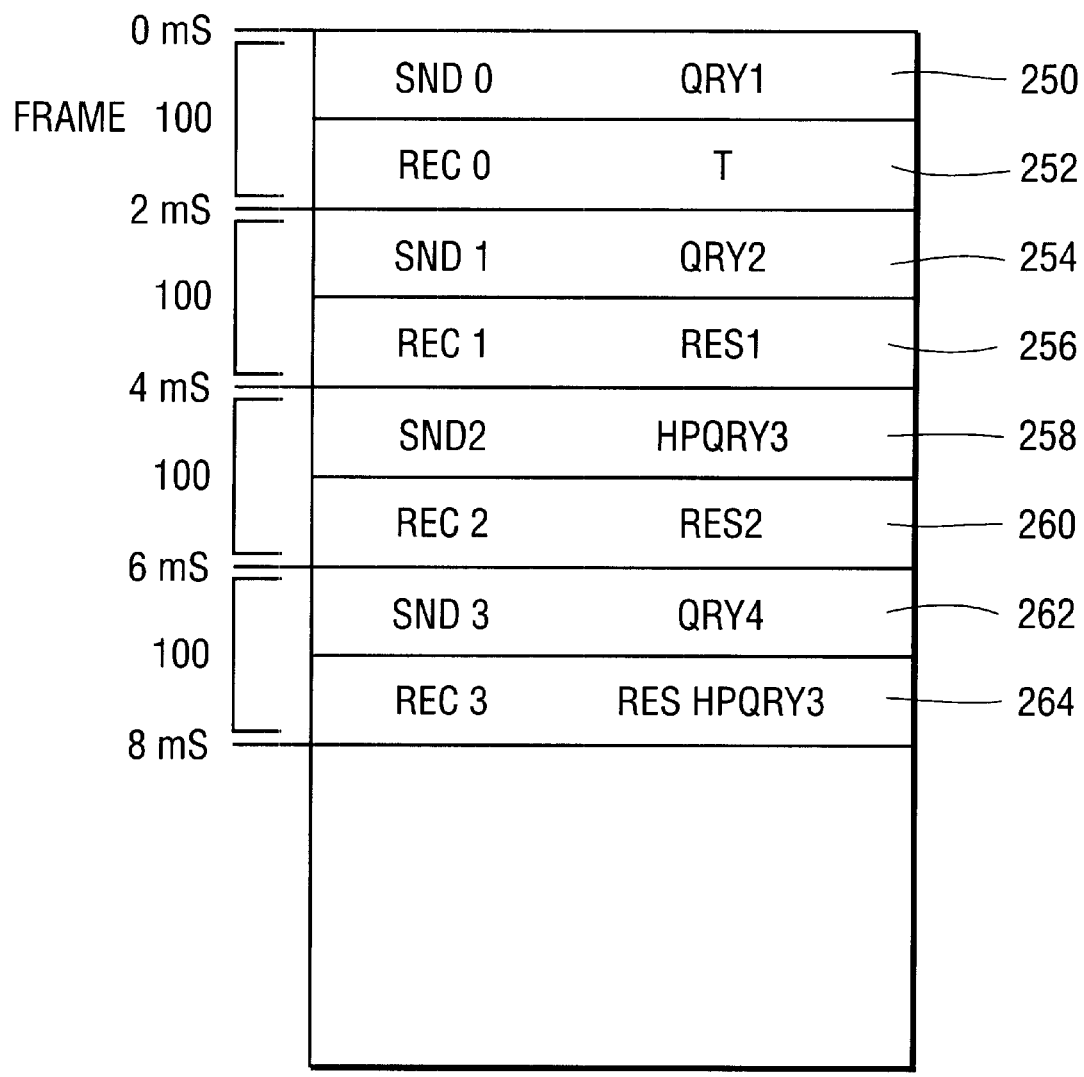
FIG. 6 is an exemplary communication sequence illustrating a processor overload prevention technique according to one embodiment of the present invention.

FIG. 6 is an exemplary communication sequence illustrating a processor overload prevention technique according to one embodiment of the present invention. Various traditional wireless communication techniques assume sufficient processing capability is available at a receiving unit to both evaluate a received message and generate a response thereto within a predetermined time.

In order to provide lower component costs, low-speed processors may be used. Low-speed processors lack the capability to evaluate a received message and generate a response within time allotted for conducting communications over the multi-frame protocol described in connection with FIG. 2. For example, microprocessors 24 and 56 (FIG. 1) may, individually or collectively, lack sufficient processing capability to receive sub-frame 107 during first time slot 102, and evaluate the received sub-frame 107 and generate a response to the received frame portion in second time slot 104 immediately following first time slot 102. Microprocessors 24 and 56 may require more than 1 millisecond for evaluation and response generation.

With respect to both base unit 12 and mobile unit 14, after receiving sub-frame 107, the receiving unit 12 or 14 generates a receive interrupt (not shown). The receive interrupt indicates that the sub-frame 107 has been received. Next, the receiving unit 12 or 14 processes the received sub-frame 107 and transmits the response to the previous sub-frame 107. Specifically, when the receiving unit is base unit 12, base unit 12 processes the sub-frame 107 received during first time slot 103 while transmitting the response to the previous sub-frame 107 during second time slot 105. Also, when the receiving unit is mobile unit 14, mobile unit 14 processes the sub-frame 107 received during second time slot 105 while transmitting the response to the previous received sub-frame 107 during first time slot 103. The receiving unit 12 or 14 is transmitting from an associated respective transmit buffer 49 and 84 respectively supported by respective memories 38 and 58.

While the receiving unit 12 or 14 is transmitting, the associated transmit buffer 49 or 84 may not be changed or the transmission may become corrupted. Then, a response is generated for the received sub-frame 107 and is stored in a software transmit buffer (not shown) supported by the appropriate memory 38 or 58. After the receiving unit has transmitted the previous response, the contents of the software transmit buffer are moved to the appropriate transmit buffer 49 or 84 for transmission during the next frame 100. For example, when the receiving unit is base unit 12, then the contents of the software transmit buffer will be moved to transmit buffer 49 during first time slot 103 because base unit 12 receives during first time slot 103. If base unit 12 changes the contents of transmit buffer 49 during second time slot 105, when base unit 12 is transmitting, the transmission may become corrupted. Similarly, when the receiving unit is mobile unit 14, then the contents of the software transmit buffer will be moved to transmit buffer 84 during second time slot 105 because mobile unit 14 receives during second time slot 105. If mobile unit 14 changes the contents of transmit buffer 84 during first time slot 103, when mobile unit 14 is transmitting, the transmission may become corrupted. In the disclosed embodiment, a received sub-frame 107 must be processed and a response generated within 2 milliseconds for transmission during the next frame 100. The processing of the received sub-frame 107 or the generation of the response may take more than 1 millisecond, but as long as the sum of the processing and generation times is less than 2 milliseconds the response will be transmitted in the proper time slot 103 or 105. Thus, a method for preventing processor overload is presented.

A message, such as message 120, is constructed at mobile unit 14. The message includes a plurality of bytes divided into a plurality of sub-frames 107. In the disclosed embodiment, the message is divided into 8 sub-frames 107. A first query 250 (QRY1) is transmitted from mobile unit 14 to base unit 12 in first time slot 102 using first sub-frame 102. Microprocessor 24 of base unit 12, in the disclosed embodiment, is insufficiently fast to evaluate QRY1 250 and generate a response for transmission in second time slot 104. Thus, base unit 12 responds with throwaway response (T) 252 which is unrelated to QRY1 using second sub-frame 104. Mobile unit 14 knows that base unit 12 is incapable of generating a response to QRY1 250 for second time slot 104 and discards T 252. Mobile unit 14 then generates a second query 254 (QRY2) and transmits QRY2 254 in the next first time slot 102 using first sub-frame 102. Base unit 12 receives QRY2 254 and transmits first query response (RES1) 256 using second sub-frame 104. RES1 256 is the base unit's response to QRY1 250. By the third millisecond, base unit 12 has had sufficient time to evaluate QRY1 250 and generate RES1 256. Specifically, base unit 12 generates RES1 256 while transmitting T 252 and receiving QRY2 254. Alternatively, base unit 12 may use any portion of the 2 milliseconds of time between receiving QRY2 254 and transmitting RES1 256 to generate RES1 256. Mobile unit 14 knows that the response in second time slot 104 between 3 milliseconds and 4 milliseconds is the response to QRY1 250 and processes RES1 256 accordingly. Mobile unit 14 then generates a high priority query 258 (HPQRY3). HPQRY3 258 is then transmitted to base unit 12 and base unit 12 responds with a response (RES2) 260 which is the response to QRY2 254. Mobile unit 14 receives RES2 260 and transmits a third query (QRY4) 262. Base unit 12 then responds to HPQRY3 258 with a response to a high priority query (RES HPQRY3) 264.

The delayed response from base unit 12 to messages from mobile unit 14 is continued in order to allow base unit 12 sufficient time to process the message and generate a response thereto. When base unit 12 is responding to a message from mobile unit 14, mobile unit 14 expects to receive the response in the following frame 100. Similarly, mobile unit 14 may delay responses to base unit 12 when microprocessor 56 of mobile unit 14 is insufficiently fast to respond to a message from base unit 12 by the next frame 100. Stated another way, mobile unit 14 may delay for one or more frames 100 before transmitting a response to a message from base unit 12. When mobile unit 14 is responding to a message from base unit 12, base unit 12 expects to receive the response two frames after sending the message. For example, a message arrives from base unit 12 during second time slot 105 (FIG. 2) of frame 0. Mobile unit 14 may be unable to generate a response thereto for transmission in first time slot 103 of frame 1. Thus, mobile unit 14 delays the transmitting the response and transmits the response during frame 2.

Figure 6A:
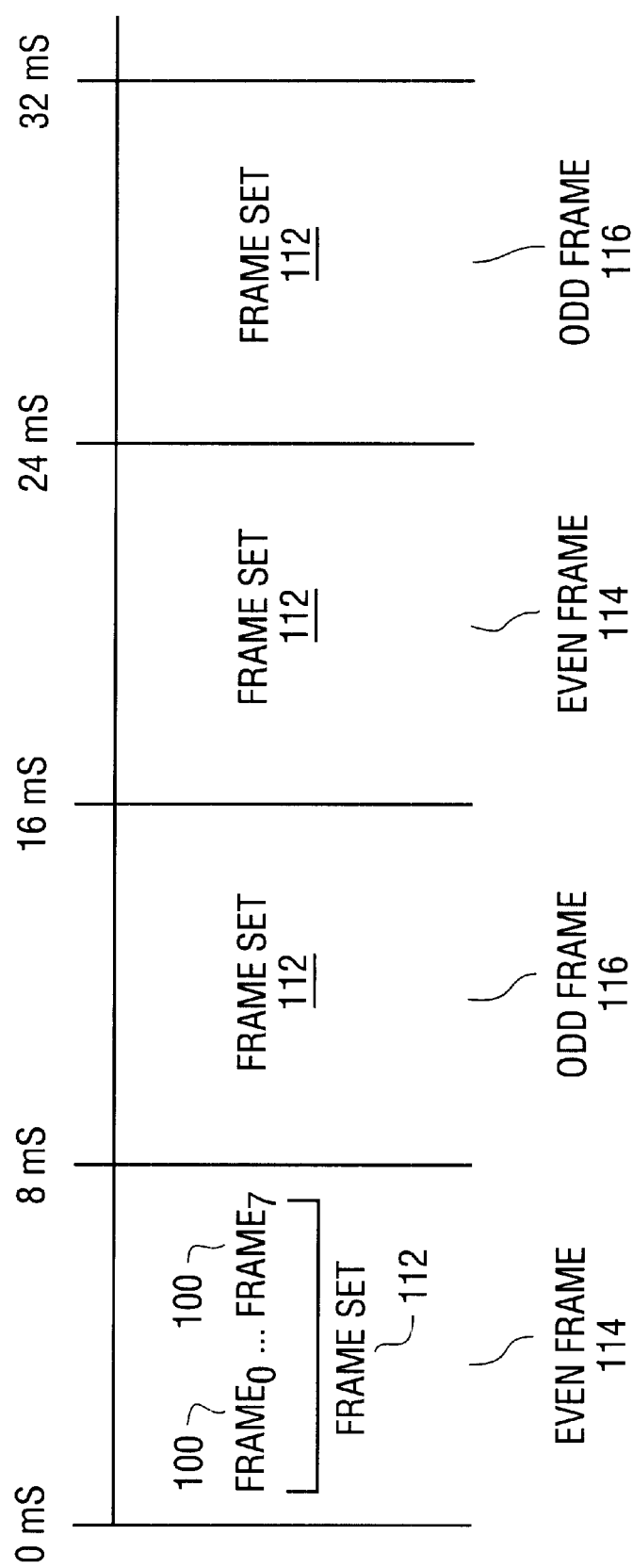
FIG. 6A is a block diagram illustrating an odd and even frame set in accordance with the teachings of the present invention.

FIG. 6A is a block diagram illustrating an odd and even frame sets in accordance with the teachings of the present invention. The processing time associated with message 120 can be large when message 120 includes an application message. Thus, when microprocessors 24 and 56 have limited computing capability, odd and even frame sets are utilized to decrease the processing responsibilities of microprocessors 24 and 56. For example, processing of the application message may take most of 1 millisecond, and may take close to 2 milliseconds, thus, after processing the application message the unit 12 or 14 which received the application message lacks sufficient time to generate a new application message for transmission because generating the new application message also may take most of 1 millisecond. The receiving unit 12 or 14 generates the response to the received application message during the 2 milliseconds before a response is expected, but is also generating the next message 120 to be transmitted. Therefore, odd and even frame sets are used to spread out the generation and response to application messages so that the receiving unit 12 or 14 has sufficient time for microprocessor 24 or 56 to generate the application message or respond to the received application message.

Each group of 8 frames 100 may be considered a frame set 112. In one embodiment, in order to further control the amount of processing performed by mobile unit 14 and base unit 12, frame sets 112 are divided into an even frame set 114 and an odd frame set 116. Even frame set 114 and odd frame set 116 are substantially similar. Both even and odd frame sets 114 and 116 include a Media Access Control (MAC) message header such as that shown in Table 3 and depicted in FIG. 3.

TABLE 3

MAC Message Header

| bit[7] | bit[6] | bit[5] | bit[4] | bit[3] | bit[2] | bit[1] | bit[0] |
|---|---|---|---|---|---|---|---|
| Reserved | | | | MAC Message Type | | | ACK |

| MAC Message Type | Meaning |
|---|---|
| 000 | MAC_ID |
| 001 | MAC_CONNECTION |

TABLE 3-continued

| 010 | APPLICATION_MESSAGE with sequence number 0 |
| 011 | APPLICATION_MESSAGE with sequence number 1 |
| All other values | Reserved |

However, during even frame set 114, the MAC message header may indicate any of the MAC message types shown in Table 3. However, during odd frame set 116, only a MAC_ID message or a MAC_CONNECTION message may be sent, as shown in Table 3. For example, during even frame set 114, the fifth frame 100 (frame 4 in FIG. 3) may comprise a portion of an application message while during odd frame set 116, the fifth frame 100 (frame 4 in FIG. 3) is the most significant byte of the identifier 48. By breaking up frames sets 112 into alternating even and odd frame sets 114 and 116, mobile unit 14 and base unit 12 are allowed to send an application message, as shown in TABLE 3, only during even frame sets 114. The application message typically involves increased processing time at the receiving unit, such as mobile unit 14 and base unit 12, and by restricting when the application message may be transmitted, the processing required at mobile unit 14 and base unit 12 is reduced. Specifically, by restricting the transmission of the application message to even frame sets 114, microprocessors 24 and 56 are not overwhelmed by the processing requirements of the application message because the application message can be transmitted only every other frame set 112 and provides respective microprocessors 24 and 56 with 16 milliseconds (8 frames 100) in which to process the application message.

Odd and even frame sets 114 and 116 are used to manage the processing load associated with providing automatic repeat requests with binary application numbers. Typically, messages 120 are fully processed after all 8 frames comprising message 120 are received. Messages 120 which include an application message often require significant processing time from microprocessor 24 or 56 respectively on the receiving unit 12 or 14. Thus, odd and even frame sets 114 and 116 are used to decrease the processing load on the receiving unit 12 or 14 by allowing application messages to be transmitted during even frame sets 114. Acknowledgment of a valid application message is sent during odd frame sets 116.

Automatic repeat requests with binary application numbers is related to the processing of application messages. In operation, messages 120 are fully received after 8 frames. After the receiving unit 12 or 14 receives message 120, a checksum portion 132 of message 120 (see FIG. 3) is evaluated. Specifically, a checksum is computed by the receiving unit and compared to checksum portion 132. If the checksum matches the contents of checksum portion 132, and message 120 arrived in even frame set 114, then the receiving unit 12 or 14 determines whether the application number matches an expected application number (not shown). The application number is part of the application message as is shown in TABLE 3. If the application number in message 120 matches the expected application number, then the expected application number is incremented. The expected application number is incremented modulo 2, thus, the expected application number toggles between 0 and 1. If the application number in message 120 does not match the expected application number the message 120 is discarded as invalid. Once message 120 has been determined to be valid or invalid, the receiving unit 12 or 14 sends an acknowledgement (not shown) to the sending unit 12 or 14.

The acknowledgement comprises a positive acknowledgment, indicating that message 120 was valid, and a negative ackowledgment, indicating that message 120 was invalid.

The ackowledgment is transmitting during odd frame set 116.

Figure 7:
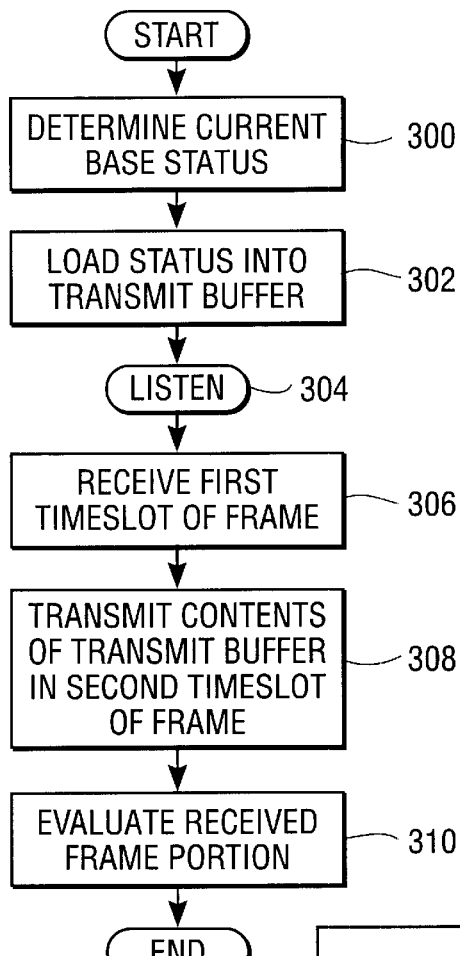
FIG. 7 is a flow chart illustrating preloading of a response at the base station when the base station is in an idle state.

FIG. 7 is a flow chart illustrating preloading of a response on base unit 12 when base unit 12 is in the idle state. Base unit 12 preloads the response because microprocessor 24 of base unit 12 may not be fast enough to evaluate sub-frame 107 received from mobile unit 14 in first time slot 102 and generate a response for transmission in second time slot 104. The method begins at step 300 where base unit 12 determines its current status. The current status of base unit 12 comprises receiving a call, no activity, sending a page to the mobile unit 14, receiving caller ID information, messages for connection setup and other suitable status conditions associated with base unit 12. Then, at step 302, base unit 12 loads a representation of the current status of base unit 12 into transmit buffer 49. In the disclosed embodiment, transmit buffer 49 comprises a single byte of memory 30. The contents of transmit buffer 49 are operable to be transmitted using wireless communication protocols to mobile unit 14. Then, at step 308, base unit 12 listens for sub-frame 107 to be transmitted from mobile unit 14. While base unit 12 is listening in step 304, base unit 12 is continuously determining its current is status at step 300 and loading the current status into transmit buffer 49 at step 302.

Proceeding to step 306, base unit 12 receives sub-frame 107 from mobile unit 14. Then, at step 308, base unit 12 immediately transmits the contents of transmit buffer 49 in second timeslot 104. At step 310, after transmitting the contents of transmit buffer 49, base unit 12 evaluates the received sub-frame 107 and takes appropriate action, such as switching to the active state or returning to step 300 and remaining in the idle state.

Figure 8:
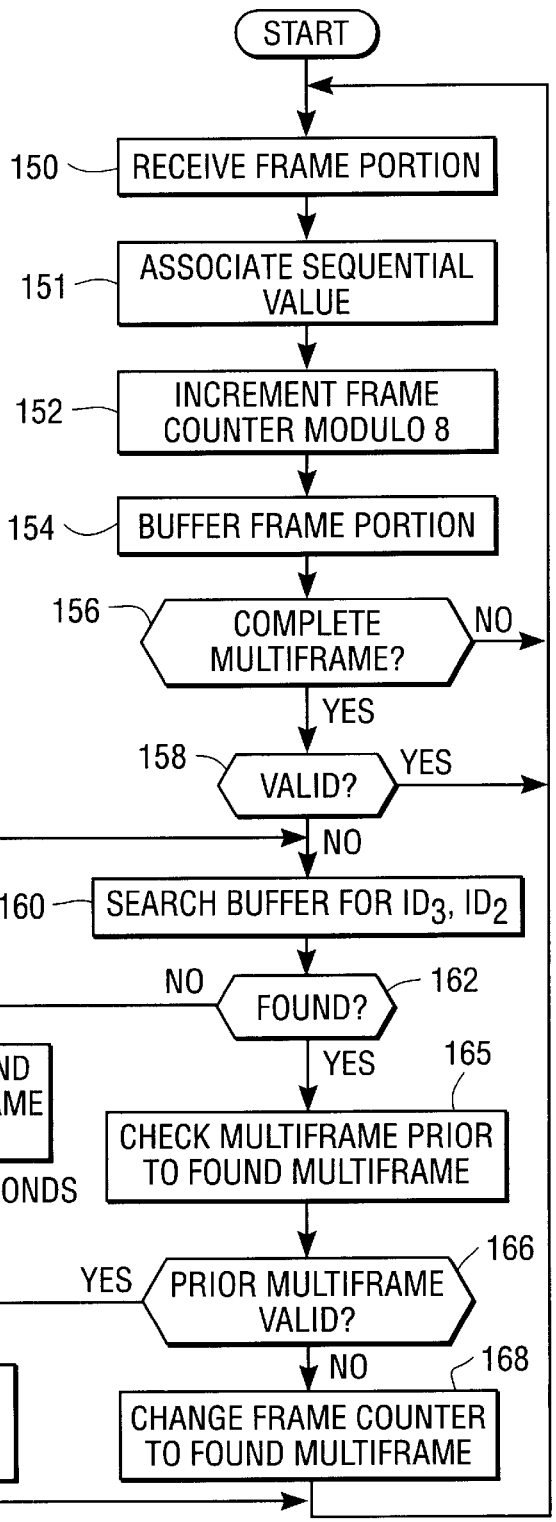
FIG. 8 is a flowchart of a method for resynchronizing respective frame counters associated with the base station and the mobile unit.

FIG. 8 is a flowchart of a method for resynchronizing frame counters 38 and 74. As mobile unit 14 and base unit 12 communicate using wireless communications, interference can cause the loss of one or more sub-frames 107 and the insertion of invalid sub-frames 107. Either the insertion of additional frame portions or the loss of frame portions caused by interference may cause misalignment of the frame counters on mobile unit 14 and base unit 12. Once the frame counters are misaligned, mobile unit 14 and base unit 12 will be unable to properly communicate because either or both of them will be misinterpreting received frames 100. For example, referring to FIG. 3, if mobile unit 14 is sending $frame_2$ while base unit 12 believes it is receiving $frame_1$ then base unit 12 will incorrectly interpret the high priority message portion that normally occurs in $frame_2$ as the $ID_2$ normally sent in $frame_1$. Thus, the method for resynchronizing frame counters 38 and 74 is provided.

The method assumes that the mobile unit 14 and base unit 12 both have the same identifier 48. As discussed previously, the mobile unit 14 and base unit 12 have matching identifiers 48. Further, each of the three bytes of the identifier are unique with respect to each other. Stated another way, for a given identifier 48, $ID_3$ is distinct from $ID_2$ and $ID_1$ and $ID_2$ is distinct from $ID_1$ ($ID_3 \ne ID_2 \ne ID_1$)

The method is performed approximately simultaneously on both mobile unit 14 and base unit 12, however, the method is described with reference to base unit 12. The method begins at step 150 where base unit 12 receives sub-frame 107 from mobile unit 14. Then, in step 152, frame counter 38 associated with base unit 12 is incremented. Frame counter 38 is initially zero before any sub-frames 107 are transmitted or received by base unit 12. Frame counter 38 is incremented modulo 8. Thus frame counter 38 has a value at any given time between 0 and 7, inclusive.

Then, at step 151, a sequential value is associated with the received sub-frame 107. The sequential value ranges from zero to seven inclusive and is the current value of frame counter 38. For example, the first sub-frame 107 received at base unit 12 will be given a sequential value of zero. The second sub-frame 107 received at base unit 12 will be assigned a sequential value of one. The eighth sub-frame 107 received at base unit 12 will have a sequential value of seven and the ninth received sub-frame 107 will have a sequential value of zero. The sequential value increases sequentially from zero to seven before repeating because sequential value is determined from frame counter 38.

Then, at step 154, control section 108 of the received sub-frame 107 is stored in buffer 36. Specifically, only control section 108 of the received sub-frame 107 is stored in buffer 36. As described above in association with the construction of the multi-frame message 120, $frame_0$ represents $ID_3$, $frame_1$ represents $ID_2$, $frame_3$ represents the MAC header and $frame_4$ represents $ID_1$. $ID_3$ is the least significant byte of identifier 48 and $ID_1$ is the most significant byte of identifier 48 (see FIG. 3).

Proceeding to decisional step 156, the method determines whether a complete multi-frame message 120 has been received. A complete multi-frame message 120 comprises eight frame portions. In a disclosed embodiment, the receipt of eight sub-frames 107 as indicated by frame counter 38 having a value of zero because frame counter 38 is incremented before determining whether a complete multi-frame 120 has been received. If a complete multi-frame message 120 has not been received then the NO branch of decisional step 156 returns to step 150 where another sub-frame 107 is received. If decisional step 156 determines that a complete multi-frame message 120 has been received then the YES branch of decisional step 156 proceeds to step 158.

Then, at decisional step 158, the method determines whether the elements of multi-frame 120 buffered at step 154 are valid. The method determines whether or not the received multi-frame 120 is valid by checking $ID_3$ and $ID_2$. Only $ID_3$ and $ID_2$ are checked because if frame counters 38 and 72 are mis-aligned, then units 12 and 14 do not know if the frame is an even frame set 114 or an odd frame set 116 and thus would not know whether $ID_1$ has been transmitted. In an alternative embodiment, an entire multi-frame 120 is validated. Since mobile unit 14 and base unit 12 are a matched pair and have identical identifiers 48, base unit 12 can compare the identifier received from mobile unit 14 to the identifier associated with base unit 12. If any of the identifier bytes are incorrect then base unit 12 knows that frame counter 38 might have become misaligned with the frame counter on mobile unit 14. In this way, base unit 12 is provided the capability to determine that extra sub-frames 107 might have been received due to interference or that sub-frames 107 might have been corrupted due to interference. Further, base unit 12 is capable of making this determination without sequencing data, such as the frame number, being provided by mobile unit 14. Since base unit 12 knows that $ID_3$ and $ID_2$ are always transmitted during $frame_0$ and $frame_1$, respectively, loss of synchronization between frame counters 38 and 72 can be determined in the absence of any additional sequencing information. If decisional step 158 determines that the identifier bytes are valid then the YES branch of decisional step 158 is followed, the base unit 12 enters an in-synchronization state and returns to step 150 for receiving another sub-frame 107. The in-synchronization state indicates that frame counters 38 and 72 are aligned. If decisional step 158 determines that frame counter 38 might have become mis-aligned then the NO branch of decisional step 158 is followed to step 160 to begin the process of resynchronizing frame counters 38 and 72 with mobile unit 14. In addition, the entire multi-frame message 120 may be checked for validity. For example, base unit 12 may also examine the checksum and MAC header in addition to $ID_3$ and $ID_2$.

Proceeding to step 160, base unit 12 enters an out-synchronization state and searches through the control section 108 information buffered at step 154. The out-synchronization state indicates that frame counters 38 and 72 are mis-aligned. Base unit 12 will search the entire buffer 36 if necessary. Then, at decisional step 162, base unit 12 determines whether valid identifier bytes exist in buffer 36. If no valid identifier bytes are found in buffer 36 then the NO branch of decisional step 162 will proceed to step 163.

At step 163, base unit 12 will receive and store frame portions from mobile unit 14 in buffer 36. The method will loop between steps 163, 160, and decisional step 162 by receiving and buffering sub-frame 107, searching buffer 36 and determining whether a valid identifier has been received until either a valid identifier is found at decisional step 162 or five seconds have passed. If a valid identifier is eventually found at step 162 then the method proceeds along the YES branch of decisional step 162. If five seconds elapse before a valid identifier is found then the method will abort and attempt a complete resynchronization with mobile unit 14 at step 164. Alternatively, any other suitable value may be used in place of the 5 second time-out used in the disclosed embodiment.

Once a valid identifier has been found at step 162, the YES branch of decisional step 162 proceeds to step 165. At step 165, base unit 12 determines whether the multi-frame 120 received prior to the multi-frame 120 containing the valid identifier found at step 162. At decisional step 166, base unit 12 determines whether the prior multi-frame to the multi-frame 120 found at step 162 contains a valid identifier. If no frame portions or less than four sub-frames 107 are present in buffer 36 prior to the multi-frame 120 having the valid identifier found at step 162, then the prior multi-frame 120 is considered to be not valid in the NO branch of decisional step 166 will be followed to step 168. If a multi-frame 120 exists in buffer 36 prior to the valid multi-frame found in at step 162, and the prior multi-frame 120 does not contain a valid identifier then the NO branch of decisional step .166 is followed to decisional step 168. The NO branch of decisional step 166 represents a determination by base unit 12 that synchronization was lost due to prior interference and that the current found identifier represents a good multi-frame 120. If the prior multi-frame 120 contains a valid identifier then the YES branch of decisional step 166 is followed to step 170. The YES branch of decisional step 166 represents a determination by base unit 12 that the loss of synchronization between frame counters 38 and 72 was caused by interference with the current multi-frame 120.

Then, at step 168, frame counter 38 is reset to align with the multi-frame 120 containing the valid identifier found at step 162. The method then returns to step 150.

At step 170, frame counter 38 is aligned with the prior multi-frame 120 to the multi-frame 120 having the valid identifier found at step 162, because base unit 12 believes that the current multi-frame 120 may be invalid while the prior multi-frame 120 is most likely valid. Thus, frame counter 158 is aligned with prior multi-frame 120 and the current multi-frame 120 is discarded. The method then returns to step 150.

Although an embodiment of the invention and its advantages are described in detail, a person skilled in the art could make various alternations, additions, and omissions without departing from the spirit and scope of the present invention as defined by the appended claims.

What is claimed is:

1. A method for selecting a communication channel in a wireless communication system comprising:
    defining a plurality of groups, each group corresponding to a plurality of communication channels;
    setting a set counter to the group having the current communication channel;
    incrementing the set counter after each channel hop;
    incrementing an index counter when the set counter resets;
    determining a sequence number as a function of the set counter and an identifier associated with the wireless communication device;
    determining an offset as a function of the sequence number and the index counter; and
    determining a next communication channel as a function of the set counter and the offset.

2. The method of claim 1, wherein determining the next communication channel comprises:
    determining a constant based on the number of channels assigned to each group; and
    determining the next communication channel as a function of the constant, the set counter and the offset.

3. The method of claim 2, wherein the number of channels in each group are equal and the constant equals the number of channels in each group.

4. The method of claim 1, wherein defining a plurality of groups comprises defining four groups, each of the four groups having 13 channels therein.

5. The method of claim 1, wherein determining the sequence number comprises:
    determining the 3 least significant bits of the identifier;
    determining the current value of the set counter; and
    determining the sequence number using a predetermined table, the table relating the current value of the set counter and the 3 least significant bits of the identifier to the sequence number.

6. The method of claim 1, wherein incrementing the set counter after each channel hop comprising changing the set counter in response to a channel change.

7. A system for wireless communication comprising:
    a wireless communication unit having a processor, a computer readable memory coupled thereto, and an identifier associated with the unit, the memory having a set counter and an index counter associated therewith;
    an application program stored in the memory and executable by the processor, the processor being operable when executing the program to:
        define a plurality of channel groups, each channel group corresponding to a plurality of communication channels;
        set the set counter to the channel group having the current communication channel;
        increment the set counter after each channel hop;
        increment the index counter when the set counter resets;
        determine a sequence number as a function of the set counter and an identifier associated with the wireless communication device;

determine an offset as a function of the sequence number and the index counter; and determine a next communication channel as a function of the set counter and the offset.

8. The system of claim 7, wherein the unit further comprises a constant determined based on the number of channels assigned to each channel group; and wherein the processor being further operable when executing the program to determine the next communication channel as a function of the constant, the set counter and the offset.

9. The system of claim 8, wherein the number of channels in each channel group are equal and the constant equals the number of channels in each channel group.

10. The system of claim 7, wherein the channel groups comprise four channel groups, each of the four channel groups having 13 channels therein.

11. The system of claim 7, wherein the identifier comprises a plurality of bits and wherein the identifier further comprises a least significant portion having 3 bits, wherein the unit further comprises a first table and wherein the processor is further operable when executing the program to:

determine the current value of the set counter; and determine the sequence number using the first table, the first table relating the current value of the set counter and the least significant portion of the identifier to the sequence number.

12. The system of claim 11, wherein the unit further comprises a second table, the second table relating the sequence number and the index counter to the offset, and wherein the processor is further operable when executing the program to determine the offset as a function of the sequence number and the index counter using the second table.

* * * * *